United States Patent [19]
Engelke et al.

[11] Patent Number: 6,075,841
[45] Date of Patent: *Jun. 13, 2000

[54] IN-LINE TEXT DISPLAY FOR TELEPHONE TERMINAL EMPLOYING DATA FILTERING

[75] Inventors: Robert M. Engelke, Madison; Kevin A. Colwell, Middleton; Ronald W. Schultz; Troy Vitek, both of Madison, all of Wis.

[73] Assignee: Ultratec, Inc., Madison, Wis.

[ * ] Notice: This patent is subject to a terminal disclaimer.

[21] Appl. No.: 08/946,538

[22] Filed: Oct. 7, 1997

Related U.S. Application Data

[63] Continuation-in-part of application No. 08/842,943, Oct. 9, 1992, Pat. No. 5,724,405, which is a continuation-in-part of application No. 08/129,894, Sep. 30, 1993, Pat. No. 5,351,288.
[60] Provisional application No. 60/028,927, Oct. 8, 1996.
[51] Int. Cl.$^7$ .................................................. H04M 11/00
[52] U.S. Cl. ........................ 379/52; 379/93.18; 379/93.28
[58] Field of Search ............................... 379/93.01, 93.09, 379/93.17, 93.18, 93.23, 93.26–93.28, 52, 93.05, 93.08, 93.14, 93.15; 340/825.19

[56] References Cited

U.S. PATENT DOCUMENTS

| | | | |
|---|---|---|---|
| 4,289,931 | 9/1981 | Baker | 379/93.17 |
| 4,503,288 | 3/1985 | Kessler | 379/93.23 |
| 4,754,474 | 6/1988 | Feinson | 379/93.18 |
| 4,839,919 | 6/1989 | Borges et al. | 379/93.23 |
| 5,724,405 | 3/1998 | Engelke et al. | 379/52 |

*Primary Examiner*—Curtis A. Kuntz
*Assistant Examiner*—George Eng
*Attorney, Agent, or Firm*—Quarles & Brady

[57] ABSTRACT

A system is described for assisting the hard of hearing in the use of the telephone, in which an in-line text display is inserted in the telephone line before a standard telephone. The in-line display blocks text related digital communications signals to the standard telephone and decodes the text related digital signals to display on a built in display screen.

1 Claim, 4 Drawing Sheets

IN-LINE TEXT DISPLAY FOR TELEPHONE TERMINAL EMPLOYING DATA FILTERING

This application is based on Provisional application 60/028,927 filed Oct. 8, 1996 entitled In-Line Text Display System as hereby incorporated by reference. This application is further a continuation-in-part on a continuation-in-part of U.S. Pat. 5,724,405 entitled Text Enhanced Telephony issued Mar. 3, 1998 which is a continuation-in-part of Ser. No. 842,943, Jan. 9, 1992, U.S. Pat. No. 5,351,288, Ser. No. 129,894, Sep. 30, 1993, and Ser. No. 155,061, Nov. 19, 1993, said Ser. No. 842,943 is a continuation-in-part of Ser. No. 616,720, Nov. 16, 1990, U.S. Pat. No. 5,081,673, which is a continuation of Ser. No. 255,357, Oct. 11, 1988, abandoned, said Ser. No. 129,894 and Ser. No. 155,061, each is a continuation-in-part of Ser. No. 886,552, May 20, 1992, abandoned.

FIELD OF THE INVENTION

The present invention relates to telephone communication in general and relates in particular, to assisted telephone communication for persons having attenuated hearing capability.

BACKGROUND OF THE INVENTION

Much of modern personal communication, both in social and business environments, takes place through the telephone. Yet, there are many persons in society who have attenuated hearing capability and are thus disabled or incapable or handicapped in using the voice telephone system commonly in use today. For person who are deaf, there has for some time been a system of communication through the telephone system which has been used by the deaf community. That system makes use of devices known as telecommunication devices for the deaf (TDDs), also known as text telephones (TTYs). Current TDDs are electronic devices consisting of a keyboard and a display and a modem, to acoustically or directly couple to a telephone line, which permit the user to type characters into their keyboard, with the characters then be encoded and transmitted over the telephone line to be displayed on the display of a communicating or remote TDD.

Current TDD communication is conducted in a code, known as Baudot or Baudot/Weitbrecht, which evolved historically at a time when many telecommunication devices for the deaf were based on mechanical or electromechanical devices rather than the current generation of electronic devices. Accordingly, the Baudot protocol was constructed for a set of constraints which are no longer relevant to present day devices. The original Baudot protocol was a uni-directional, or simplex, system of communication conducted at 45.5 baud. The normal Baudot character set consists of a 5 bit characters, and the system is a bi-tonal system based on 1400 and 1800 hertz tones. The protocol does not utilize a carrier when no signals are being sent, and because of the protocol for character transmission, which includes a start bit and at least 1½ stop bits, it is only possible to send approximately 6 characters per second, one way, during conventional Baudot communications.

In spite of its limitations, the Baudot communication system, and TDDs, are widely used within the community of persons who are deaf. In addition, systems have been implemented to permit users of the TDD system to communication with hearing people. This is done through the use of a so-called "relay." A relay, as used herein, refers to a system of voice to TDD communication which uses an operator referred to as a call assistant who serves as an intermediate between a hearing user on one telephone line and a deaf TDD user on a second telephone line. The call assistant wears a headset to communicate by voice with the hearing user and also has access to a TDD so that the call assistant can communicate with the deaf user via the TDD. Thus, the call assistant serves as an intermediary between the deaf person and the hearing person so as to, in effect, translate from voice to digital electronic forms of communication.

While the TDD communication system has a constituency within the deaf community, it is not widely used by persons who are deficient in hearing capability, but would not describe themselves as deaf. Many otherwise fully able persons, particularly elderly ones, suffer attenuated hearing capability due to aging, disease, or other traumatic condition. Many persons who have some degree of hearing capability left do not consider themselves "rdeaf," and therefore will tend not to avail themselves of specialized equipment intended for the deaf community. If a person has spent much of his or her life engaged in oral communication using the spoken word in the telephone, it is difficult to accept that telephonic communication may become difficult or impractical as one's hearing declines in efficiency. No system has heretofore existed which is capable of assisting the person who has significant hearing loss, in communication over the telephone in a manner which emulates, to the fullest extent possible, the normal telephonic communication patterns of hearing people.

SUMMARY OF THE INVENTION

The present invention is summarized in that text enhanced telephonic capabilities are made available to persons with standard telephone equipment who have a hearing loss. The capabilities are provided with minimal additional equipment by using existing components of the standard telephone such as the handset or the PBX interface circuitry.

Other objects, advantages, and features of the present invention will become apparent from the following specification when taken in conjunction with the accompanying drawings.

DETAILED DESCRIPTION OF THE PREFERRED EMBODIMENT

Figure 1:
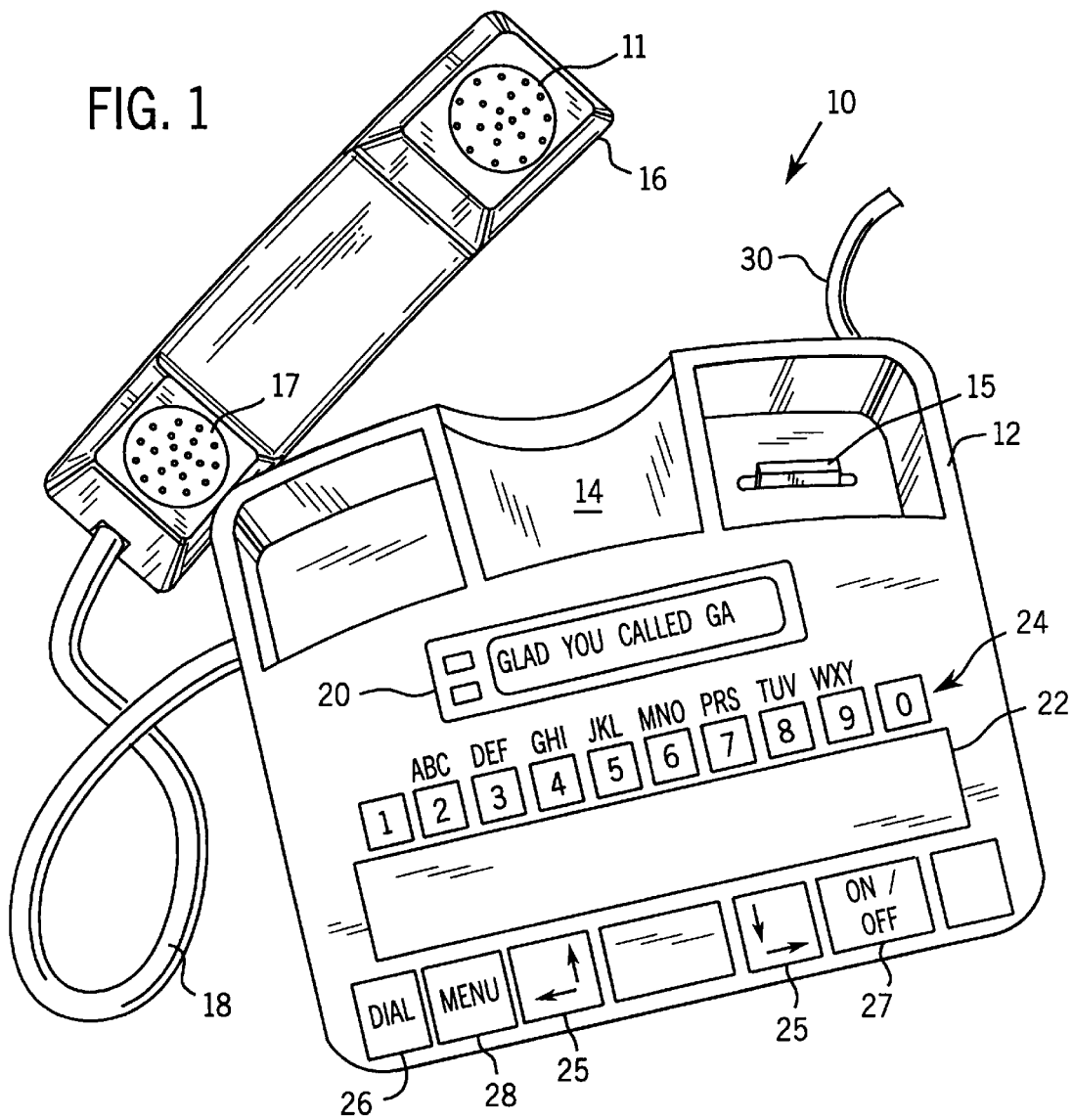
FIG. 1 is a perspective view of a unified TDD/telephone per the present invention.

Referring to FIG. 1, a TDD unit 10 having unified TDD/telephone features has a housing 12 exposing at its rearmost upper surface, a cradle 14 supporting a conventional telephone handset 16 having a mouthpiece microphone 17 and an earpiece speaker 11 as is well understood in the art. The microphone 17 and speaker 11 of the handset 16 are connected by a flexible electrical cable 18 to circuitry within the housing 12 as will be described below. When the handset 16 is in place in the cradle 14, it depresses a cradle switch 15 providing an electrical signal indicating that the handset 16 is in place in the cradle 14. The term "handset", as used herein, should be considered to embrace not only traditional handsets intended to be held next to the head but also their equivalent structure such as wearable microphone/headphone combinations and stationary microphone speaker sets such as are found in speaker phones and the like.

A standard QWERTY keyboard 22 formed of rows and columns of electrical pushbutton keys is presented at the frontmost upper surface of the housing 12. Three rows of the keyboard 22 comprise letters. A fourth, top row 24 comprises the Arabic numerals from 0 to 9, much in the fashion of a standard typewriter or computer keyboard.

Between the cradle 14 and the keyboard 22 and tipped upward and forward so as to be visible to a user of a keyboard 22 is a two-line liquid crystal display LCD 20 suitable for the display of both numbers and letters.

Special "menu", "dial", and "on/off" and cursor pushbuttons 28, 26, 27 and 25 are positioned to the side of the keyboard 22. The TDD 10 is connected to the telephone lines 30 by means of a standard telephone jack (not visible in FIG. 1) at the rear of the housing 12.

When the TDD 10 is used as a telephone, the handset 16 may be removed from the cradle 14 and voice conversations undertaken. When used as a TDD, received text is displayed on the display 20 and responses are typed by the user on keyboard 22. The display may also display certain status messages as will be described and upon pressing of the menu key 28, provides a set of menus on the display 20 allowing the user to access advanced features, such as a call timer, by use of the cursor keys 25 which maneuver a cursor on the display 20 to select the desired feature.

Dialing of the TDD 10 in either case is accomplished by the use of the numeric key row 24 which has imprinted above each number the three letter series found on a standard telephone for use in cases where the telephone number includes letters. Distinguishing between the use of the upper keyboard row 24 for dialing or for entering numeric characters is done by a dialing key 26 which may be activated by the user and which displays a dialing symbol on the display 20 to indicate that the numeric key row 24 is being used for dialing rather than TDD characters to be transmitted.

Figure 2:
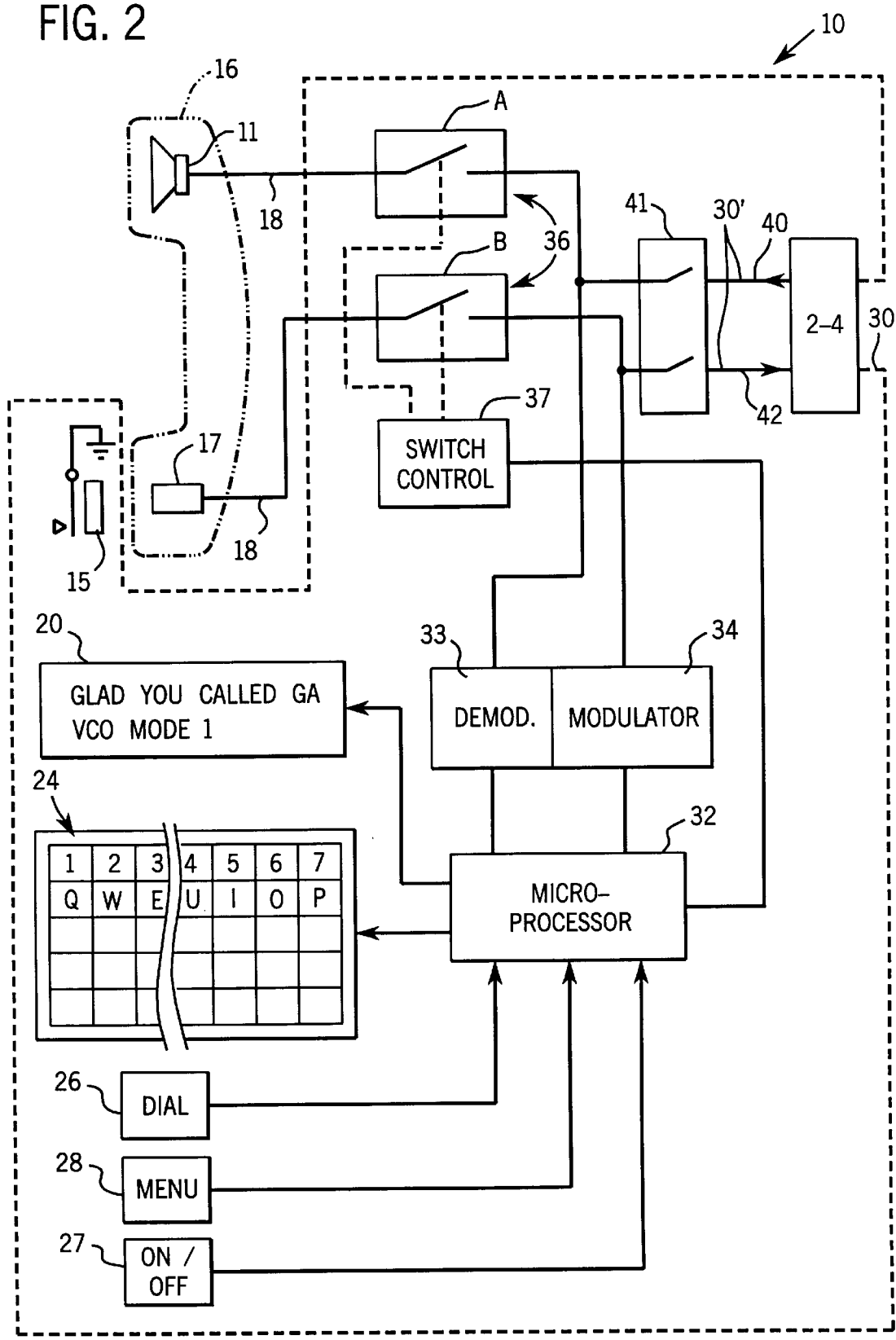
FIG. 2 is a schematic block diagram of the major components of the unified TDD/telephone of FIG. 1 showing the connections of an internal microprocessor to the various components of the device of FIG. 1 including a mode switch for routing text and voice.

Referring now to FIGS. 1 and 2, the display 20 and keyboard 22 are connected with a microprocessor 32 which receives digital data from the keyboard 22 and which provides data to be displayed on the display 20 as is well understood in the art. Microprocessor 32 also receives electrical signals from the menu key 28, the dialing key 26, the on/off key 27 and the cradle switch 15.

The microprocessor 32 may receive data from the telephone lines 30. Telephone lines 30 first pass through a two-to-four (2–4) line converter 31 which converts the standard two line telephone lines 30 to its four line equivalent 30' having a separate received signal line 40, along which signals may be received by the TDD 10, and a separate transmitted signal line 42 along which signals may be transmitted from the TDD 10 prior to passing out of the housing 12. The transmitted signal line 42 and the received signal line 40 next pass through a relay 41 which disconnects both from the TDD 10 when the TDD 10 is off, i.e., no call is in progress.

The microprocessor receives signals from the received signal line 40, after they pass through a demodulator 33 which converts the Baudot tones to voltage levels readable by the microprocessor 32. The output of the demodulator 33 provides a signal that indicates to the microprocessor whether there is text present on the telephone lines 30, and also allow the microprocessor to decode any such text according to conventional methods. Generally, text may be distinguished from voice by its spectral content, the uninterrupted duration of the signal within a particular spectral band, and in the case of text, whether the decoded tones map to legal characters under the specific data communications protocol in use.

The microprocessor 32 may also transmit data on the telephone lines 30 via a modulator 34 which converts voltage levels produced by the microprocessor 32 to Baudot tones to be transmitted to the telephone lines 30 via transmitted signal line 42. The modulator 34 may provide not only Baudot tones needed for text communication over the telephone lines 30 but also the dual tone multi-frequency modulation (DTMF) required to dial a telephone.

A switch unit 36 provides two independent single pole, single throw switches A and B as implemented in solid state circuitry well known in the art. The positions of each switch A and B may be independently moved between an open and closed position by switch controls unit 37 which receives commands from the microprocessor 32. When closed, switch A connects the received signal line 40 directly to the speaker 11. When open, the switch A provides a high impedance path between the received signal line 40 and the speaker 11 muting the sound received by the user but providing some residual volume as has been found useful as a audible cue to the user indicating the receipt of data and the functioning of the handset.

Likewise, when closed, switch B connects the transmitted signal line 42 directly to the microphone 17. When open, the switch B provides a high impedance path between the transmitted signal line 42 and the microphone.

Each switch A and B may be operated together or separately by means of switch control unit 37 receiving a signal from microprocessor 32. Thus, it will be apparent that under the control of microprocessor 32, voice signals may be independently switched between telephone lines 30, the speaker 11, and the microphone 17.

Figure 3:
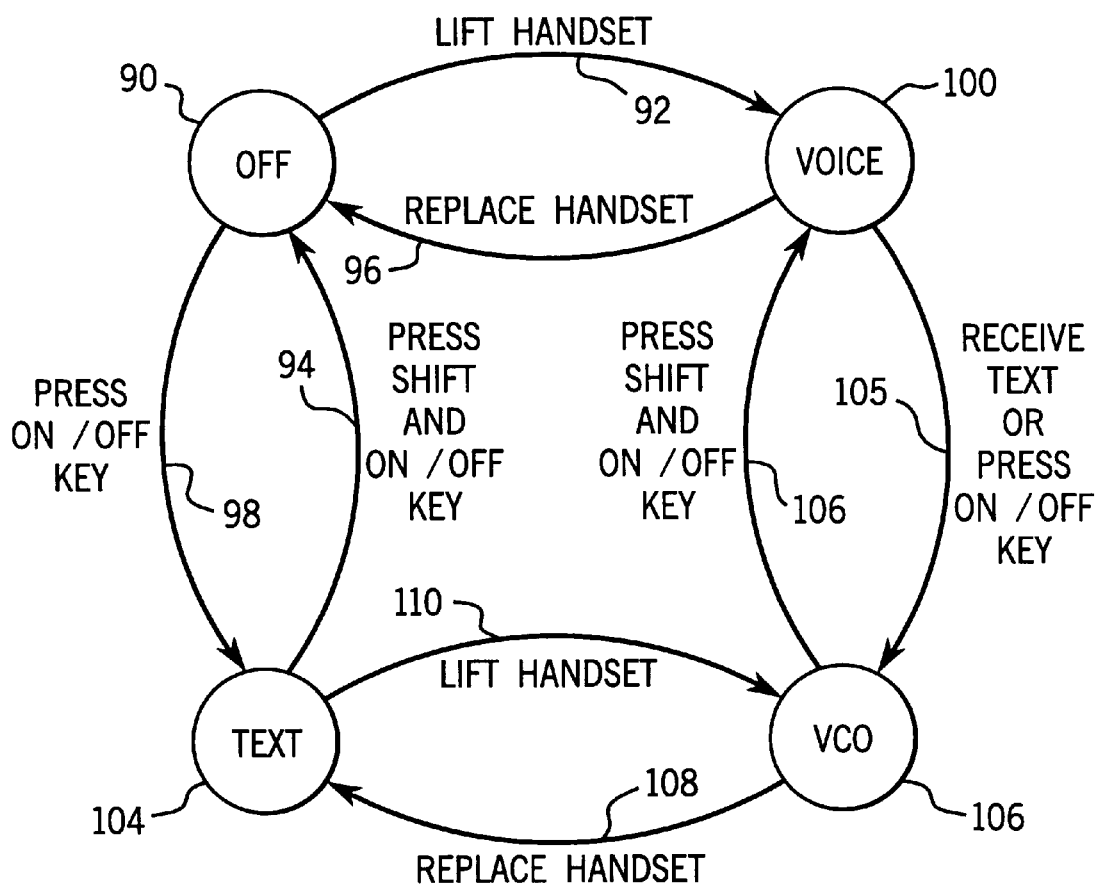
FIG. 3 is a state chart showing the states of a program executed by the microprocessor of FIG. 2 in determining the appropriate state of the switch of FIG. 2.

Referring now to FIGS. 2 and 3, the microprocessor 32 includes a program for controlling the switch unit 36 according to the state of the TDD 10 in one of four modes: OFF, VOICE MODE, TEXT MODE, and VCO MODE (voice carry-over). The position of the switches A and B are changed according to the particular mode as indicated in Table I.

TABLE 1

| Mode | Switch A | Switch B |
| --- | --- | --- |
| OFF | NA | NA |
| VOICE MODE | closed | closed |
| TEXT MODE | open | open |
| VCO MODE | switched | switched |

The first mode is the OFF mode 90 where the relay 41 is open and the TDD 10 is disconnected entirely from the telephone line 30. The TDD 10 starts in this mode when it is first powered-up or when it is idle prior to receiving the telephone call or after a call is terminated. Switches A and B arbitrarily remain in a closed position.

The TDD 10 moves from the OFF mode 90 to a VOICE MODE 100 when the handset is lifted as indicated by state change arrow 92. In the VOICE MODE 100, the switch unit 36 is simply configured to connect the handset 16 to the telephone lines 30 for telephone operation. Thus, if one is intending to make a voice telephone call or is answering the telephone unaware of whether the source of the incoming call is a TDD or a telephone, the TDD 10 will always move first to the VOICE MODE 100. Replacing the handset in the VOICE mode 100 causes the TDD 10 to move to the OFF mode, hanging up the telephone as indicated by state change arrow 96.

If the on/off key 27 is pressed in VOICE MODE 100, the switch moves to VCO mode 106 indicated by state change arrow 105. This latter situation may arise when a hearing user detects that a newly received call is a TDD call based on the presence of a limited number of Baudot tones.

If the call is a voice call, the TDD 10 will remain in VOICE MODE 100 and the call may be answered. If however, a predetermined amount of incoming text is detected, per a text detector circuit implemented in the programming of the microprocessor 32, the TDD 10 will switch to VCO MODE 106 as indicated by that state change 105. Thus, no special training is required for a hearing individual to use the TDD/telephone as a telephone in most situations. VOICE mode 100 can be returned to by pressing the shift key and the on/off key 27.

In contrast, if one wishes to make a TDD call, the on/off key 27 may be pressed without removing the handset 16, thereby causing the TDD 10 to move from the OFF mode 90 to TEXT MODE 104 as indicated by state change arrow 98. Pressing the shift key (not shown) and the on/off key 27 together returns on to the OFF mode 90 terminating the call. This combination of key strokes prevents accidental hanging up of the TDD 10 while typing.

Only in TEXT MODE 104 will an automatic TDD identification signal be transmitted by the TDD 10 for use or example by emergency services after the dialing of a umber. Such an automatic identification signal serves to identify the TDD 10 as a TDD to remote devices having certain call recognizing circuitry and thus to eliminate time wasted determining the call type. In VOICE mode 100, where the TDD/telephone is presumably calling a voice telephone, an automatic identification signal, which is in the form of a text signal, would be inappropriate and irritating. The automatic identification signal is generated by the microprocessor 32 and may consist of one or more text characters recalled from the microprocessor's memory.

The VCO MODE 106 may also be reached from the TEXT MODE 104 by lifting the handset 16, after TEXT MODE 104 has been entered, as indicated by state change arrow 110. Faint Baudot tones will be heard on the handset by the hearing individual indicating that a TDD message is still incoming, if this in fact is the case. The experienced user will be able to use the TDD 10 in this mode with a voice relay as has previously been described, as a result of a switching sequence performed by switch unit 36 to be described in more detail below. Replacing the handset, while in VCO mode 106 returns the user to the TEXT mode 104, as indicated by state change arrow 108.

The VCO MODE 106 is useful both for hearing individuals who are speech impaired and wish to use a voice carry over relay service as has been described or for deaf individuals that wish to use a relay service permitting them to speak directly to the opposite party yet to receive responses on the display 20.

The name of the current mode is displayed on the display 20 by microprocessor 32.

Referring to TABLE 2 in the VCO mode, the handset 16 and more specifically, the microphone 17 and speaker 11 of the handset 16 are switchable depending on the presence of text data on the telephone lines 30 and the source of that data as either external, from a remote TDD connected on the telephone lines 30, or internal from the keyboard 22.

TABLE 2

|  | Switch B | Switch A |
|---|---|---|
| Text Present (external source) | open after three characters in 1.5 seconds | open after three characters in 1.5 seconds |
| External Source Text No Longer Present | close after 0.3 seconds | close after 2.5 seconds |
| Text Present (internal source) | open immediately | open iminediately |
| Internal Source Text Non Longer Present | close after 0.3 seconds | close after 2.5 seconds |

The voice frequency band and the text frequency band overlap and thus the demodulator 33 used by the microprocessor 32 to develop a text present signal will occasionally indicate apparent Baudot tones when no text is present on telephone lines 30. Even with further processing, occasional false text detection may disrupt conversation on the TDD/telephone in VOICE MODE 100. This possibility is eliminated by delaying any opening of the switches A and B, to mute text data and prevent corruption of text data by sounds received by microphone 17, unless three characters have been received in a rolling window of 1.5 seconds. Shorter detection thresholds could be used, however, it has been determined that it is preferable for intelligibility to admit some text signals to the handset 16 rather than prematurely truncate voice communications over the handset 16.

This text detection problem only occurs if the source of the text is external to the TDD 10. If the source of the text is internal, i.e., from the keyboard 22, then detection may be made immediately by detecting keyboard signals instead of text on the telephone lines 30 and there is no delay in the opening of switches A and B.

The closing of the switches A and B can also be disruptive. Such switching can cause clicks in the handset speaker 11 and changes in the background noise level which may be distracting. For this reason and given that the transmission of text occurs at discrete and separated intervals, it is necessary, in any case, to delay the closing of the switches after the last text character has been detected to avoid needless switching activity. Thus, the re-closing of switches A and B is delayed in both the case of internal and external source text.

Nevertheless, it has been determined that a user of the TDD 10, watching the text message on the display 20, may be able to anticipate the conclusion of a message in much less time that this delay or may wish to respond more quickly that this delay would allow. Thus, the microphone 17 and speaker 11 are independently switched with the microphone switch B closed earlier to allow rapid response, but the speaker switch A closed later to prevent the disruptive clicking. Implicit in this design is the recognition that serious corruption of text data by the microphone signal produced by the user's response is unlikely in most calling situations.

SYSTEMS FOR USE WITH STANDARD TELEPHONES

Figure 4:
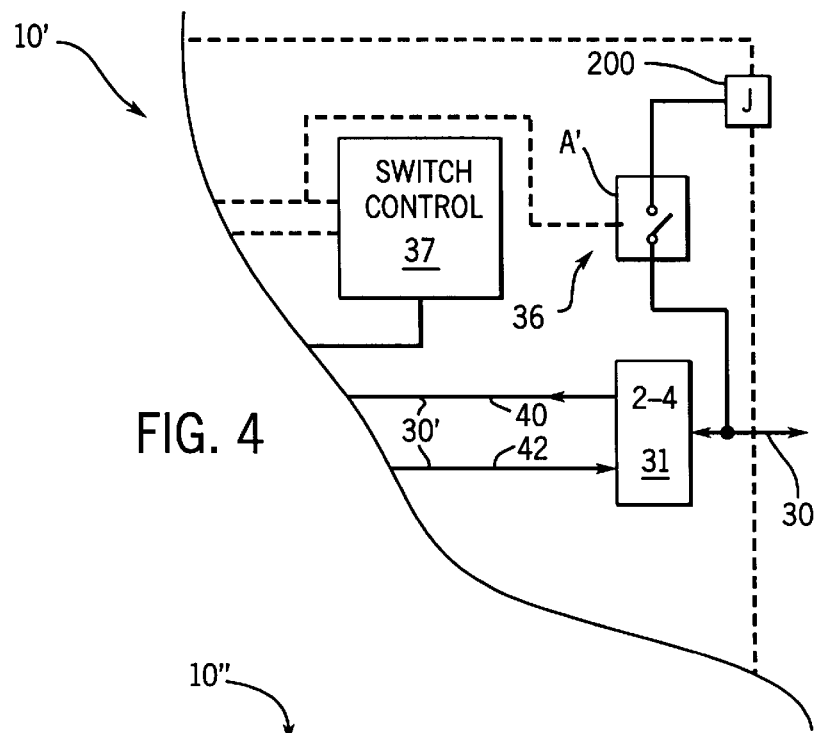
FIG. 4 is a fragmentary view of a schematic block diagram similar to that of FIG. 2 showing an alternative embodiment incorporating a jack connecting a TDD system to a standard telephone to provide text blocking in that telephone.

Referring now to FIGS. 2 and 4, in an alternative embodiment, a solid-state switch unit 36 designated A' may be placed to connect with the telephone line 30 at one side and to communicate the signals on the telephone line 30 to a standard telephone jack 200 when switch A' is closed. A standard telephone (not shown) may be plugged in to the jack 200. Switch A' will typically switch both lines of the telephone line 30 and thus may be a double pole switch but in other respects is similar to switches 36 described above.

Switch A' receives a switch control signal from switch control 37 identical to that previously described for controlling switch A attached to the speaker 11 within the handset 16 (shown in FIG. 2). Thus when text is detected on either the telephone line 30 or as initiated from the keyboard 24 (also shown in FIG. 2), switch A' is opened, disconnecting the standard telephone that may be plugged into jack 200. The effect of this additional switch A' is to provide text blocking in a standard telephone when plugged into the TDD 10' of this embodiment.

It will be recognized that by providing jack 200, the handset 16 associated with the TDD 10' may be dispensed with entirely and the handset of the telephone connected to jack 200 may be used instead. Similarly, the keyboard 24 (shown in FIG. 2) may optionally be eliminated so that the TDD unit 10' becomes a simple display-only unit that may accompany a standard telephone.

Figure 5:
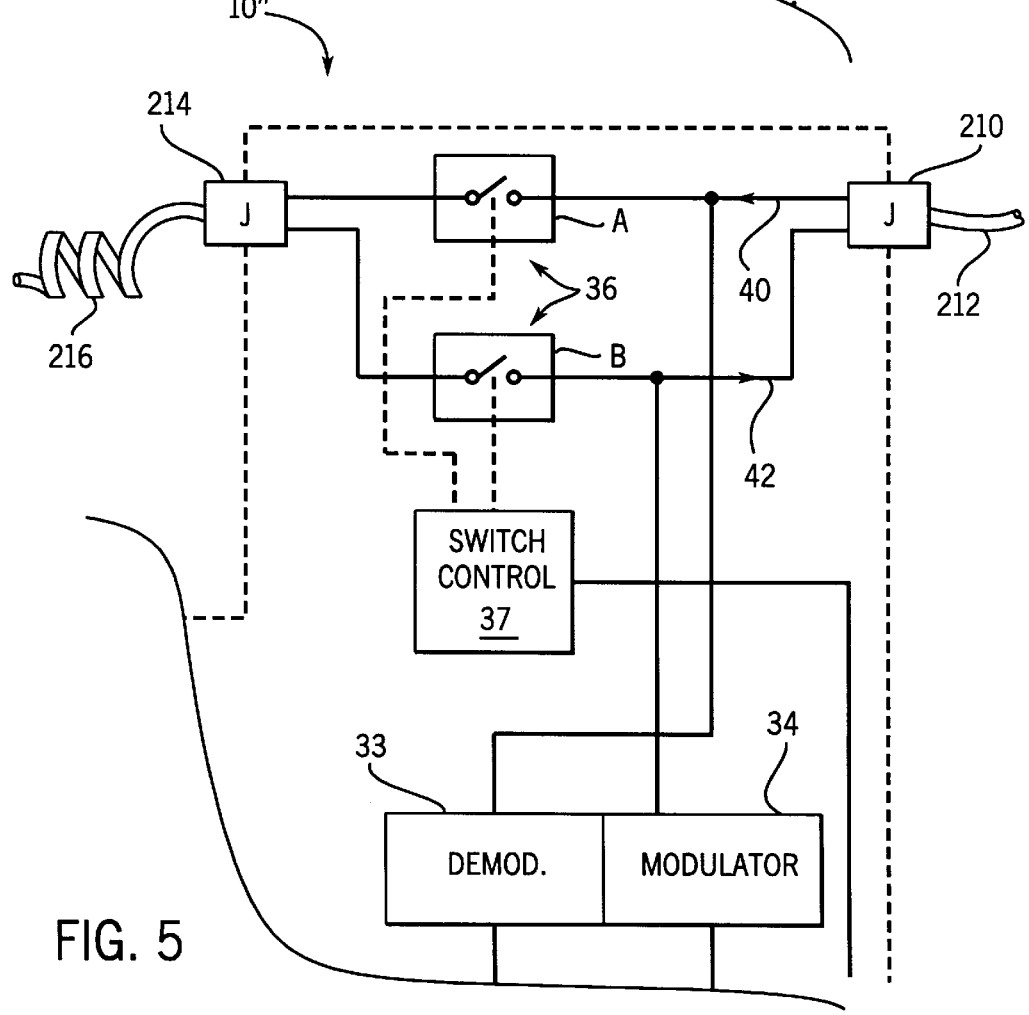
FIG. 5 is a fragmentary view of a schematic block diagram similar to that of FIGS. 2 and 4 showing a third alternative embodiment incorporating a first input jack connecting to a standard telephone at the handset jack and a second output jack connecting to a standard telephone handset to provide text blocking in that handset such as may be useful in PBX type systems.

Referring now to FIG. 5, in certain situations, and in particular with private branch exchange systems (PBX systems), such as are used in many businesses, the signal on the telephone line 30 will be encoded in a possibly proprietary digital coding scheme. In order to avoid designing many different products for each PBX system and to further avoid the need to make a direct connection to the telephone line 30 in an alternative embodiment, a second jack 210 may be placed on a TDD unit 10" for receiving a cable 212 that may be attached to the handset-out jack on a PBX-style telephone (not shown) that normally receives the handset cord. The signals on cable 212 will be those normally found after the two-to-four line converter 31 described with respect to FIG. 2 and well known in the art. The received signal line 40 and transmitted signal line 42 normally found after the two-to-four line converter 31, in this case, come directly from the jack 210 and may received by the switches A and B previously described.

The other sides of switches A and B are connected to yet another jack 214 which may receive a cord 216 to the handset of the PBX-style telephone.

The switches A and B operate as described before with respect to FIG. 2. Thus the TDD unit 10' may be placed between the handset of a PBX telephone and the PBX telephone to provide text blocking as has been discussed so that a user of the PBX telephone cannot hear or hears only an attenuated version of a text signal that may be present on the telephone line 30.

As before, switch B prevents the introduction of voice signals from the microphone 17 (shown in FIG. 2) into the telephone line 30 during a text transmission. It will be understood further that the embodiment of FIG. 5 may also include only a display 20 (shown in FIG. 2).

The above description has been that of a preferred embodiment of the present invention. It will occur to those that practice the art that many modifications may be made without departing from the spirit and scope of the invention. For example, the attenuation of the signals to and from the handset may be such as to completely block the signals and thus the term attenuation used herein should be considered to include complete blocking of the signals.

We claim:

1. A text display system for use with a standard telephone terminal having a means for receiving telephone signals from a telephone line and having a handset, the text display system comprising:

an input means for receiving the telephone signals from the telephone line;

a text attenuation device connected to the input means to receive the telephone signals therefrom and to preferentially obstruct Baudot digital communication tones from passing through the text attenuation device to form a filtered output;

an output jack providing a connection connected to the telephone terminal for communicating the filtered output received from the text attenuation device with the telephone terminal;

a demodulator connected to the input means before the text attenuation circuit to convert any text communication at the digital communication tones to digital signals;

a microprocessor connected to receive the digital signals from the demodulator and to identify any characters encoded in the digital signals; and a visually readable display to display the characters identified by the microprocessor, the microprocessor programmed to display on the display the characters as they are received so that text communications received by the system are display to be read by a user.

* * * * *

UNITED STATES PATENT AND TRADEMARK OFFICE
CERTIFICATE OF CORRECTION

PATENT NO.   : 6,075,841
DATED        : June 13, 2000
INVENTOR(S)  : Engelke et al.

It is certified that error appears in the above-identified patent and that said Letters Patent is hereby corrected as shown below:

Column 2,
Line 18, "rdeaf" should be -- deaf --.

Column 5,
Line 38, "or" should be -- for --.
Line 39, "umber" should be -- number --.

Signed and Sealed this

Twenty-second Day of January, 2002

Attest:

JAMES E. ROGAN
Attesting Officer — Director of the United States Patent and Trademark Office